May 8, 1956     W. SCHICK     2,745,048
ELECTRIC CAPACITORS
Filed Nov. 23, 1954
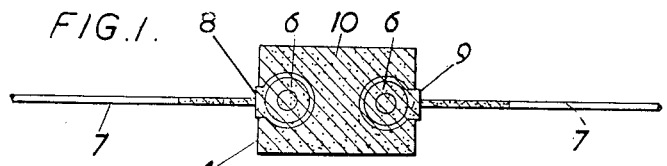
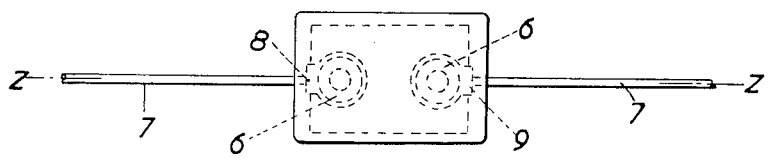
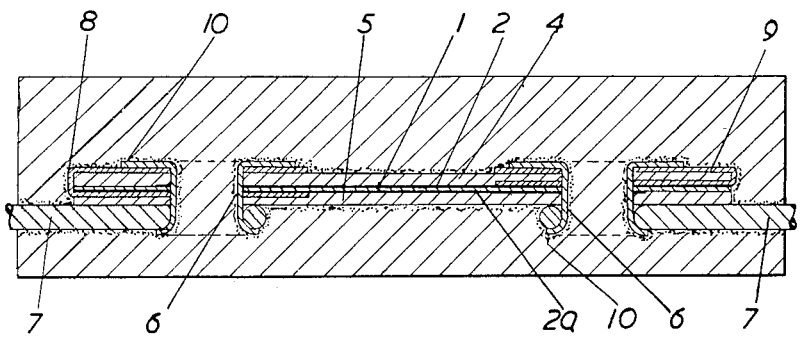
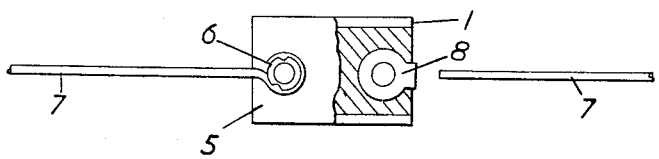
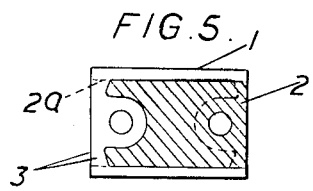
Inventor
Walter SCHICK
By
Attorney

United States Patent Office 2,745,048
Patented May 8, 1956

2,745,048

ELECTRIC CAPACITORS

Walter Schick, Ilford, England

Application November 23, 1954, Serial No. 470,724

Claims priority, application Great Britain December 1, 1953

8 Claims. (Cl. 317—258)

The invention relates to electric capacitors of the kind comprising thin metallic electrodes with lead-in conductor wires or strips, separated by mica dielectric plates not exceeding two and a half mils in thickness and secured between relatively thick supporting plates of insulating material for mechanical strengthening, the whole being enclosed in a moulded casing of insulating plastic material which casing is interrupted only where the conductor wires or strips project therethrough.

The electrodes may be formed by metallic layers adhering to the mica dielectric material or may be formed by metallic foils.

Such capacitors are often found to become impaired due to ingress of moisture and although this difficulty is mitigated by impregnation of the casing with wax or insulating varnish it is not entirely avoided.

It is an object of this invention to provide an electric capacitor with improved resistance to ingress of moisture.

It is a further object of the invention to provide an electric capacitor of the kind referred to having not only improved resistance to ingress of moisture but improved mechanical stability of the assembly of electrodes, dielectric material and supporting plates.

It is found that the difficulty which has been encountered arising from ingress of moisture may be avoided by coating the aforesaid assembly before incorporating this in its plastic casing, with a suitable insulating coating composition which bonds to the surface of the assembly including the peripheral surfaces of the lead in wires.

It has previously been attempted to supplement the protection afforded by the impregnation of the moulded casing by applying a coating composition to the assembly of supporting plates, electrodes and dielectric plate and for this purpose various compositions comprising powdered insulating material and a high percentage of a resinous binder have been tried, but the results obtained have not been satisfactory.

Now I have found that a surprisingly improved result is obtained with an insulating coating composition comprising an insulating mineral powder and a binder resin if the proportion of the insulating mineral powder is increased up to at least 70% by weight and preferably to 80–85% or even higher, provided sufficient binder resin is present for bonding the powder to form an effective continuous coating bonded to the surface of the assembly of the supporting plates the electrodes and the mica dielectric plate or plates.

The choice of mineral powder is found not to be critical provided the powder has good insulating properties and provided it is used in a quantity of at least 70% by weight of the coating composition, and preferably at least 80%. Talc, and mica powder have been employed with success as well as calcium carbonate, calcium fluoride and calcium sulphate.

The function of the resin is to bind the mineral powder particles to form a continuous coating and to bond the coating to the electrode, dielectric and supporting plate assembly and any commercially available resin effective for this purpose may be employed. Good results have been obtained with oil modified alkyd resins.

A coating composition which is at present preferred, comprises calcium sulphate (which term is to be understood to include gypsum and plaster of Paris) as the mineral powder, in combination with an oil-modified alkyd resin as binder. An actual composition which has given good results comprises 83% of powdered calcium sulphate and 17% of an oil-modified alkyd resin the parts being by weight. For application of the coating, the calcium sulphate is stably dispersed in the resin dissolved in a solvent compatible therewith and a layer of the composition is applied to the capacitor assembly so as to form a continuous coating over the entire surface of the assembly with only the lead-in conductor wires projecting through the coating. The coated assembly is then stoved to heat cure the composition and then incorporated in its moulded plastic casing, i. e., of Bakelite (registered trademark).

The nature of the treatment of the coating after application to the assembly, by stoving or otherwise, will depend on the nature of the resin.

Good results have also been obtained in successive tests using calcium carbonate, calcium fluoride, talc and mica in place of the calcium sulphate, the powder and resin in the different compositions being in the same proportion as in the foregoing example employing calcium sulphate.

It is found that the fineness of the powder may be such that the powder passes a screen of 200 mesh. This degree of fineness however is not in itself critical. In general the choice of particle size should be governed by the aim to achieve effective bonding by as small a percentage as possible of the resin, and at any rate a percentage not exceeding 30% by weight.

A capacitor according to the invention incorporating the insulating coating of the assembly of the electrodes, dielectric material and strengthening plates and a suitably impregnated casing has been found to be virtually moisture proof, and in addition, the assembly aforesaid is so strengthened mechanically that where multiple electrodes are included relative displacement thereof in the course of moulding the casing is practically prevented the moulding being stably conjoined with the assembly aforesaid including the lead-in conductor wires or strips. In consequence the electrical stability of the capacitor is kept substantially constant in use.

The insulating coating composition may be applied mechanically to the capacitor assembly before applying the plastic casing. For example the assembly can be brought mechanically to a layer of the coating composition and the faces of the assembly successively applied to the layer.

In order that the present invention may be the more readily understood, reference is hereafter made to the constructional form illustrated by way of example in the accompanying drawings, in which:

Fig. 1 is a top plan view of a capacitor assembly according to the present invention.

Fig. 2 is a plan view of a capacitor assembly incorporated in its plastic casing.

Fig. 3 is a longitudinal section on the line Z—Z of Fig. 2, on an enlarged scale.

Fig. 4 is an underneath plan view of the capacitor assembly according to Fig. 1 with the lower supporting plate broken away to show the lower electrode.

Fig. 5 is a plan view of the dielectric plate showing the silver layer forming the upper electrode the lower electrode being the same but endwise reversed as indicated in dotted outline.

In one mode of constructing an incorporated capacitor according to the present invention and as shown in Figs.

2 and 3 we provide a thin mica dielectric plate 1 having a very thin silver layer 2, 2a formed by known means upon each of the two faces 3 thereof. The combined mica and silver plate(s) 1 is/are then assembled between two relatively thick supporting plates 4, 5 (Fig. 3), made from a strong insulating material such as mica or other suitable dielectric such as that sold under the registered trademark Bakelite The assembly is secured by two hollow rivets 6 which pass through the said supporting plates 4 and 5 (Fig. 3). The said rivets 6 also form the contact electrodes, one rivet being connected with each silver layer 2, 2a and both rivets 6 being connected with short lengths of conducting members in the form of wire or strip adapted for connection to the external circuit. The conducting path between the rivets 6 and the metallic electrodes 2, 2a is effected by folded metal foils 8, 9 through which the rivets 6 pass, one limb of a clip contacting with a metallic electrode 2 or 2a and the other limb of the said clip with the appertaining rivet.

The capacitor assembly, comprising the electrodes 2, 2a with the lead in conductor wires, the dielectric plate 1 and the supporting plates 4, 5, has then formed thereon a strengthening and moisture proofing coating 10 of an insulating composition containing in the specific embodiment 83% by weight of calcium sulphate powder, and 17% by weight of binder resin which in the specific embodiment is an oil modified alkyd resin sold as Beckosol 1313. The coating extends at least some way along the lead-in conducting wires or strips. The powder is mixed, and the coating is applied, with the resin in solvent solution and after coating, the assembly may be stoved or otherwise treated as necessary, whereafter the coated assembly is incorporated in a casing of moulded insulating resin sold as Bakelite X4933 and stably conjoined therewith, whereby the electrical stability of the capacitor is promoted.

The capacitor casing is finally impregnated with microcrystalline hydrocarbon wax.

To promote conjoining of the coated capacitor assembly with its moulded casing, the filler material of the moulding powder may consist of or comprise a quantity of the mineral powder used in the coating composition.

The invention is not limited to a capacitor assembly containing one capacitor but each assembly may contain two or more capacitors which may be arranged in series or in parallel or in combinations thereof by means of suitable contact electrodes and connections.

What I claim is:

1. An electric capacitor comprising as an assembly at least two thin metallic electrodes with lead-in conductor members, a mica dielectric plate not exceeding two and a half mils in thickness separating said electrodes, and relatively thick insulating supporting plates between which said so-separated electrodes are secured for mechanical strengthening said assembly being enclosed save for projecting end portions of the said conductor members in an insulating coating of a composition comprising at least 70% by weight of an insulating mineral powder, and a resin for binding the powder, said coating bonding with said assembly including the peripheral surfaces of said lead-in wires, and said coated assembly being incorporated in a casing of insulating plastic material.

2. An electric capacitor according to claim 1 wherein the insulating mineral powder of the insulating coating composition is a calcium salt selected from the group calcium sulphate, calcium carbonate and calcium fluoride.

3. An electric capacitor according to claim 1 wherein the insulating mineral powder is mica.

4. An electric capacitor according to claim 1 wherein the insulating mineral powder is talc.

5. An electric capacitor comprising as an assembly at least two thin metallic electrodes with lead-in conductor members, a mica dielectric plate not exceeding two and a half mils in thickness separating said electrodes and relatively thick supporting plates of insulating material between which said so separated electrodes are secured for mechanical strengthening, said assembly having formed thereon an insulating coating of a composition comprising at least 70% by weight of calcium sulphate powder bound by a resin and said coated assembly being incorporated in a casing of insulating plastic material impregnated against ingress of moisture.

6. An electric capacitor comprising as an assembly, at least two thin metallic electrodes with lead-in conductor members, a mica dielectric plate not exceeding two and a half mils in thickness separating said electrodes and relatively thick insulating supporting plates between which said so separated electrodes are secured for mechanical strengthening, said assembly being enclosed save for projecting end portions of the said conductor members in an insulating coating of a composition comprising at least 80% by weight of an insulating mineral powder, and an oil modified alkyd resin for binding the powder, said coating bonding with said assembly including the peripheral surfaces of said lead-in wires, and said coated assembly being incorporated in a casing of insulating plastic material, said casing being impregnated against ingress of moisture, and bonding with said coated assembly.

7. An electric capacitor according to claim 6 wherein the coating composition contains approximately 83% by weight of the mineral powder and approximately 17% by weight of the binder resin.

8. An electric capacitor comprising as an assembly, at least two thin metallic electrodes with lead-in conductor members, a mica dielectric plate not exceeding two and a half mils in thickness separating said electrodes and relatively thick supporting plates of insulating material between which said so separated electrodes are secured for mechanical strengthening, said assembly having formed thereon an insulating coating of a composition comprising at least 80% by weight of an insulating mineral powder, and a resin for binding the powder, the coated assembly being incorporated in a casing formed of an insulating plastic material constituted in part by a quantity of mineral powder of the same composition as the mineral powder employed in said coating composition.

References Cited in the file of this patent

UNITED STATES PATENTS

| | | |
|---|---|---|
| 2,506,446 | Dubilier | May 2, 1950 |
| 2,596,134 | Dorst | May 13, 1952 |